United States Patent

Goshima et al.

[15] 3,687,395

[45] Aug. 29, 1972

[54] MODE SWITCHING SYSTEM FOR MAGNETIC RECORDING-REPRODUCING APPARATUS

[72] Inventors: Takeshi Goshima, Tokyo; Shoji Ohta, Funabashi; Nobuhiro Imai, Tokyo, all of Japan

[73] Assignee: Canon Kabushiki Kaisha, Tokyo, Japan

[22] Filed: Aug. 24, 1970

[21] Appl. No.: 66,421

[30] Foreign Application Priority Data

Aug. 27, 1969 Japan ......................44/67311
Aug. 27, 1969 Japan ......................44/67313

[52] U.S. Cl. ............242/180, 35/35 C, 242/55.19 R, 242/202, 274/4 D

[51] Int. Cl. ........................G09b 19/04, G11b 15/29

[58] Field of Search.......242/180, 181, 202, 55.19 R; 35/35 C; 179/100.2 MD; 274/4 D, 11 D, 11 E

[56] References Cited

UNITED STATES PATENTS

| | | | |
|---|---|---|---|
| 3,299,538 | 1/1967 | Cooper | 35/35 C |
| 3,323,230 | 6/1967 | Cooper | 242/180 X |

FOREIGN PATENTS OR APPLICATIONS

| | | | |
|---|---|---|---|
| 730,664 | 5/1955 | Great Britain | 35/35 C |

*Primary Examiner*—George F. Mautz
*Assistant Examiner*—Edward J. McCarthy
*Attorney*—Ward, McElhannon, Brooks & Fitzpatrick

[57] ABSTRACT

A magnetic recording-reproducing apparatus has a first magnetic tape with a long recording time and a second magnetic tape with a shorter recording time. The first tape is driven by a motor through a capstan connected to the motor and a pinch roller. The second tape is also driven at a predetermined speed. First drive means drives both of the first and second tapes simultaneously. Second drive means moves the pinch roller or capstan for the first tape away from the other. The pressure contact between the capstan and the pinch roller is released when the second drive means is actuated to stop the transportation of the first tape.

12 Claims, 8 Drawing Figures

MODE SWITCHING SYSTEM FOR MAGNETIC RECORDING-REPRODUCING APPARATUS

BACKGROUND OF THE INVENTION

The present invention relates to a magnetic recording-reproducing apparatus and more particularly to a mode switching system for magnetic recording-reproducing apparatus having a first magnetic tape and a second endless magnetic tape.

PRIOR ART

Magnetic recording-reproducing apparatus are widely used for various purposes because recording and reproducing may be made in a relatively simple manner. When the apparatus is utilized for learning a foreign language, a tape upon which are recorded pronounciations, sentences, etc. (to be referred to as "-pattern speeches" hereinafter) is reproduced and if required a student may imitate the pattern speeches and record upon a track other than the track upon which are recorded the pattern speeches. Thereafter, the pattern speech tape is rewound and then reproduced again together with the speeches recorded by the student for comparison so as to improve his skill. Such system is for example disclosed by U.S. Pat. No. 2,876,561.

According to this system, after the pattern speech tape is reproduced and the speeches imitated by the student are recorded, the tape must be rewound by a predetermined length, stopped and switched between the recording and reproduction or play back modes. These operations are very complex so that the student tends to give up his will for learning a foreign language. The above described problem is also the problem of a dictaphone which functions in a similar manner as the magnetic recording-reproducing apparatus for learning a foreign language of the type described above.

The problem may be overcome by a magnetic recording-reproducing apparatus (to be referred to as "tape recorder" hereinafter) of the type in which a first magnetic tape with a relatively longer recording time and a second endless tape are employed in such a manner that when the first tape is reproduced, the reproduced signals are also recorded or reprinted upon the second endless tape, whereby when it is desired to reproduce a desired portion of the first tape, the second tape upon which is recorded this desired portion may be repetitively reproduced. When the tape recorder of the type described is used as a dictating machine, the information such as correspondence, reports, etc. to be typed are recorded upon the first magnetic tape and reproduced by a typist. A portion difficult to understand may be reprinted upon the second magnetic tape so as to be repetitively reproduced until the typist understands while the first tape is stopped. Thereafter, both of the first and second tapes may be transported so as to reproduce the next sentence. Therefore, the above-described defect may be overcome without rewinding the first tape.

When the second magnetic tape has two tracks, one track may be used for recording or reprinting from the first tape while the second track may be used for recording the speeches imitated by the student. When the second tape is reproduced, the student may hear simultaneously both of the pattern speeches and his imitation. If required, he may erase the speeches on the second track and record the new speech he imitates. When he repeats this process, his skill may be improved gradually. The system of the type described is for example disclosed by U.S. Pat. No. 3,059,348, but since the first and second tapes must be selectively transported for recording or playback, the system is complex in construction and operation because the rise-up time characteristics of the tapes must be improved. For example, when the system is switched from one mode in which the first tape is reproduced and reprinted on the second endless tape to the mode in which the reproduction of the first tape is stopped while only the second tape is reproduced, a "STOP" button must be depressed in order to stop the transport of the first tape and then an "OPERATION" button for transporting the second tape must be depressed.

However, upon depression of the STOP button, the whole mechanism of the tape recorder is stopped temporarily so that the rise-up time characteristic of the tape when the "OPERATION" button is depressed becomes worse. Furthermore, the operation that is the selection between the modes becomes complex. When the first tape is also transported together with the second tape, the rise time characteristic of the first tape is also lowered.

SUMMARY OF THE INVENTION

The present invention has been made to overcome the above-described problems.

One of the objects of the present invention is to provide a system by which the switching between the mode recording-reproducing of the second magnetic recording medium and the mode or reproducing and reprinting of the first magnetic recording medium to the second recording medium may be accomplished in a simple manner by a single operation or actuating member.

Another object of the present invention is to provide a tape recorder in which the switching between the mode of reproducing the first magnetic recording medium and reprinting thereof upon the second magnetic recording medium and the mode of recording and reproducing of the second endless magnetic recording medium may be accomplished by a remote control unit.

The invention becomes more apparent from the following description of the illustrative embodiments thereof taken in conjunction with the accompanying drawing.

PREFERRED EMBODIMENT OF THE INVENTION

Figures 1, 2:
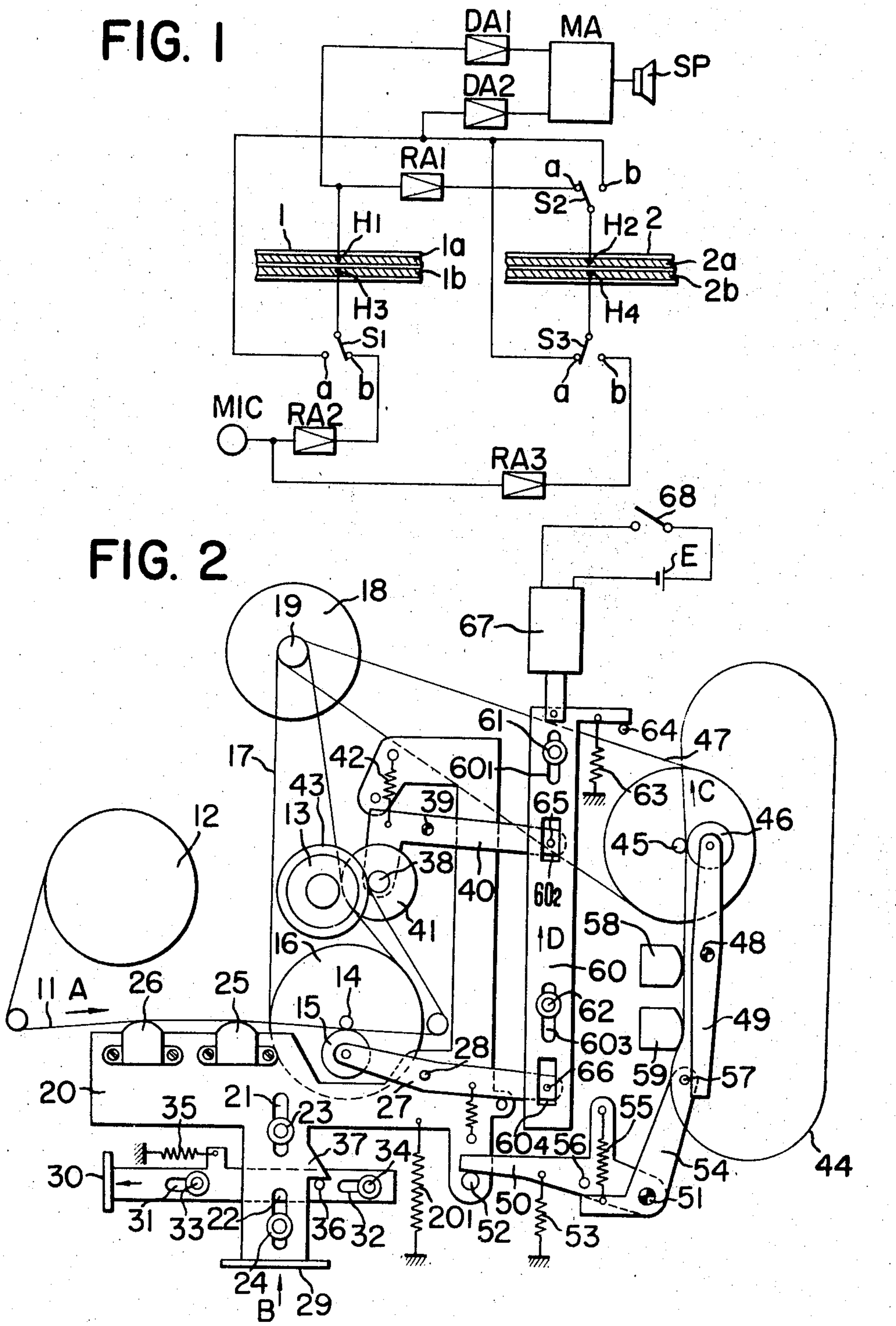
FIG. 1 is an electric circuit diagram of a tape recorder embodying the present invention.
FIG. 2 and 3 are diagrammatic views illustrating a first embodiment of the present invention.
Figure 3:
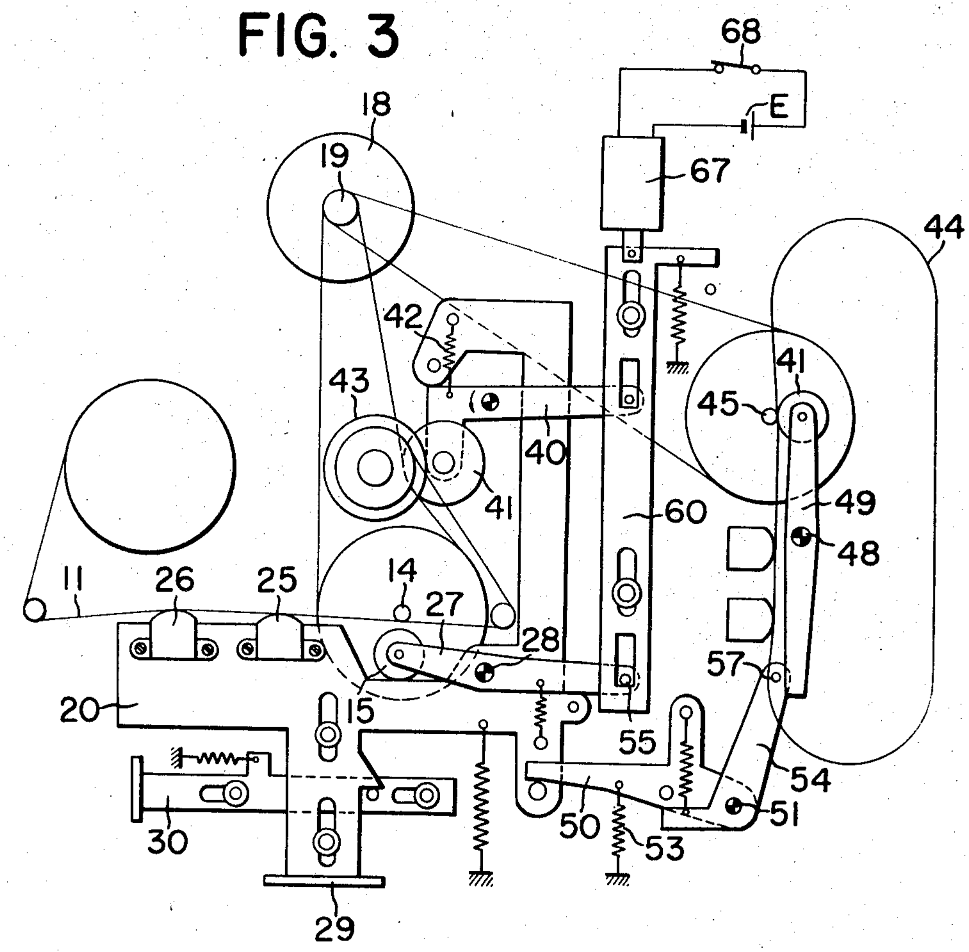

FIG. 1 is a diagrammatic view illustrating a tape recorder circuit embodying the present invention for learning a foreign language. A magnetic tape 1 with a relatively long recording time is wound by a reel to be described hereinafter and has two tracks 1$a$ and 1$b$. The pattern speeches are recorded in the track 1$a$ while the track 1$b$ is reserved for a student for recording and reproducing his speeches. An endless tape 2 with a relatively shorter recording time has also two tracks 2$a$ and 2$b$ so that the pattern speeches in the track 1$a$ may be reprinted in the track 2$a$ while the student may use the track 2$b$ for recording his speeches. $H_1$ designates a reproduce head for the track 1$a$; RA1, a recording amplifier; and $S_2$, a switch which is switched to the terminal $b$ when the tape 1 is stopped while the tape 2 is transported and is switched to the terminal $a$ when the tape 1 is reproduced. To reproduce the tape 2, the switch $S_2$ is switched to the terminal $b$. $H_2$ is a record-reproduce head for the track 2$a$. The magnetic tape 2 is transported when the magnetic tape 1 is transported as will be described hereinafter. A pre-amplifier DA1 is connected to a main amplifier MA. A pre-amplifier DA2 is also connected to the main amplifier MA and to the terminal $b$ of the switch $S_2$ and the terminals a of the selection switches $S_1$ and $S_3$ respectively. The selection switches $S_1$ and $S_3$ are switched to the terminals $a$ when the student wants to record his imitating speeches into the tracks 1$b$ and 2$b$. The outputs of a microphone MIC are fed into the recording amplifiers RA2 and RA3 respectively. A loudspeaker SP is driven by the main amplifier MA. Record-reproduce heads $H_3$ and $H_4$ are provided for the tracks 1$b$ and 2$b$ respectively.

The pattern speeches recorded on the track 1$a$ is reproduced by the loudspeaker SP through the head $H_1$, the pre-amplifier DA1 and the main amplifier MA. When the tape 1 is transported, the tape 2 is also transported so that the output signals of the head $H_1$ is superposed upon the high frequency bias signals in the recording amplifier RA1 and then recorded upon the track 2$a$ of the magnetic tape 2 through the head $H_2$. When the selection switch $S_3$ is switched to the terminal $b$ and the student imitates the speeches he hears through the loudspeaker SP, the imitated speeches may be recorded upon the tracks 1$b$ and 2$b$ of the magnetic tapes 1 and 2 through the microphone MIC, the record amplifiers RA2 and RA3 and the heads $H_3$ and $H_4$ respectively. When only the tape 2 is transported while the tape 1 is stopped, the switch $S_2$ is switched to the terminal $b$. When the selection switch $S_3$ is manually switched to the terminal $a$, the pattern speeches and the imitated speeches recorded on the tracks 2$a$ and 2$b$ are reproduced through the amplifiers DA2 and MA and the loudspeaker SP, so that the student may compare his speeches with the pattern speeches. When the endless tape 2 makes one revolution, the student may switch the selection switch $S_3$ to the terminal $b$ so that he may imitate the pattern speeches heard through the loudspeaker SP and record them again on the track 2$b$ through the microphone MIC. When he switches the selection switch $S_3$ to the terminal $a$ again, he can compare his imitated speeches with the pattern speeches through the loudspeaker in a similar manner as described above.

The present invention may be applied to a tape recorder of the type described above for learning a foreign language or dictation, and will be described in more detail hereinafter with reference to FIGS. 2–8.

First referring to FIG. 2, the magnetic tape 11 of the type corresponding to the tape 1 described with reference to FIG. 1 is transported from a payoff reel 12 to a takeup reel 13 by means of a capstan 14 and a pinch roller 15. The capstan 14 is driven by a motor 18 through a flywheel having a relatively greater inertia and a belt. A record-reproduce head 25 and a erase head 26 (the former corresponding to the heads $H_1$ and $H_3$ described in reference to FIG. 1) are carried by a carrier member 20 which is movable vertically in FIG. 2 while being guided by guide pins 23 and 24 fitted into the slots 21 formed through the carrier member 20. An arm 27 carrying the pinch roller 15 at one ends thereof is pivotably fixed by a pivot 28 to the carrier member 20.

An actuating or operation member 29 is formed integral with the carrier member 20 and has a projection 37. A stop member 30 is guided by guide pins 33 and 34 fitted into slots 31 and 32 formed through the stop member 30 and is normally biased toward the left by means of a return spring 35. The stop member 30 has a stop pin 36 extended from the upper surface thereof and adapted to engage with the stepped portion 37 of the operation member 29 so that the latter may be held is operative position.

A drive roller 38 for driving the take-up reel 13 is rotatably carried by a lever 40 which in turn is pivotably fixed to a chassis. A driven roller carried coaxially by the shaft of the drive roller 38 is driven through the belt by the motor 18. The drive roller 38 is pressed against the reel table 43 by a spring 42 loaded between the lever 40 and the carrier member 20. An endless tape 44, which corresponds to the magnetic tape 2 in FIG. 1, is transported by means of a capstan 45 and a pinch roller 46. A flywheel carried by the shaft of the capstan 45 is driven by the motor 18 through a belt 47. The pinch roller 46 is rotatably fixed to a pinch roller arm 49 pivoted to the chassis by a pivot 48. One free end of an intermediate lever 50 pivoted by means of a pivot 51 is normally pressed against a pin 52 extending from the carrier member 20 under the force of a return spring 53. An pinch roller actuating lever 54 also pivoted by the pivot 51 is normally biased by a spring 55 so that its free end may be pressed against a pin 56 extending from the intermediate lever 50. Actuating pin 57 extending from the other end of the actuating lever 54 engages with the free end of the pinch roller arm 49. A magnetic record-reproduce head 58 corresponds to the heads $H_2$ and $H_4$ shown in FIG. 1 and an erase head 59 is provided.

A switch member 60 is vertically movable by guide pins 61 and 62 fitted into slots $60_1$ and $60_3$ respectively and is normally biased downwardly by a spring 63, but is stopped by a stopper 64. The pins 65 and 66 extending from the drive roller arm 40 and pinch roller arm 27 are fitted into the slots $60_2$ and $60_4$ formed in the switch member 60 respectively. When a remote switch 68 is turned on, an electromagnet or plunger 67 is energinzed so that the switch member 60 is moved upwardly, thereby causing the levers 40 and 27 to move in the counterclockwise direction through the pins 65 and 66 respectively. In consequence, the drive roller 38 and the pinch roller 15 are moved away from the reel table 43 and the capstan 14 respectively so that the tape 11 is stopped. E is an electric power source for energizing the electromagnet 67.

Next the mode of operation will be described. When the operation member 29 is pushed in the direction indicated by B, the magnetic heads 25 and 26 are pressed against the magnetic tape 11 while the pinch roller 15 is pressed against the capstan 14 through the tape 11. The pin 36 of the stop member 30 slides toward the right along the sloping side of the projection 37 of the carrier member 20 and then engages with the stepped portion of the projection 37 as shown in FIG. 2 so that the carrier member 20 is locked. When a motor-switch (not shown) is thrown in response to the locking of the carrier member, the motor 18 starts to rotate. The pin 52 of the carrier member 20 causes the lever 50 to rotate in the clockwise direction so that the spring 55 is charged. Under the force of this charged spring 55, the lever 54 is caused to rotate in the clockwise direction so that its pin 57 rotates the pinch roller arm 49 in the counterclockwise direction, whereby the pinch roller 46 is pressed against the capstan 45 through the tape 44. Thus, the capstans 14,45 and the table 43 are driven by the motor 18 so that the tapes 11 and 44 are transported at a fixed speed to the directions indicated by the arrows A and C respectively. As explained with reference to FIG. 1, the pattern speeches may be reproduced from the tape 11 through the speaker while simultaneously recorded on the tape 44.

When the remote switch 68 is closed through a hand switch or pedal switch so as to close the circuit, the electromagnet 67 is energized so that the switch member 60 is moved upwardly against the spring 63, whereby the pins 65 and 66 fitted into the slots $60_2$ and $60_4$ are also moved upwardly. In consequence, the levers 40 and 27 are rotated in the counterclockwise direction against their springs so that the drive roller 38 carried by the lever 40 is moved away from the reel table 43 while the pinch roller 15 on the arm 27 is moved away from the tape 11, whereby the takeup reel 13 is stopped while the tape 11 is stopped. (See FIG. 3). However, the carrier member 20 remains locked so that the tape 44 is continued to be transported at a fixed speed. When the switch $S_2$ is switched to the terminal b in response to the energization of the electromagnet 67, the pattern speeches recorded upon the magnetic tape 44 may be repetively reproduced through the head 58 which corresponds to the head $H_2$ in FIG. 1. During this time, the student imitates the pattern speeches reproduced and record his speeches upon the magnetic tape 44 through the microphone MIC by switching the switch $S_3$ in FIG. 3 in a manner described hereinabove.

When the remote switch 68 is turned off, the electromagnet 67 is de-energized so that the switch member 60 is returned to its normal position under the force of the return spring 63, whereby the levers 40 and 27 are returned to their normal positions by their return springs respectively. In consequence, the drive roller 38 is pressed against the reel table 43 while the pinch roller 15 is pressed against the capstan 14 so that the magnetic tape 11 is transported and taken up by the takeup reel 13. Thus, the tape 11 is reproduced again.

From the foregoing it is seen that the first magnetic tape may be set into the playback mode only by depressing the reproduction button on the tape recorder and the switching between the recording and play back modes may be made only by the switch in the student's or operator's hand. There is another advantage that the tape-transport mechanism is not required to be stopped when the recording and playback modes are switched. To stop the tapes 11 and 44, the stop member 30 is pushed toward the right so that the pin 36 is released from the stepped portion of the projection 37. In consequence the carrier member 20 is returned to its inoperative position under the force of the return spring 20, so that the motor-switch is turned off, thereby stopping the motor 18. Simultaneously, both of the pinch rollers 15 and 46 are moved away from the capstans 15 and 45 while the drive roller 38 is spaced apart from the reel table 43. Thus, the tape recorder is completely stopped.

SECOND EMBODIMENT, FIGS. 4, 5, 6 AND 7

Figure 4:
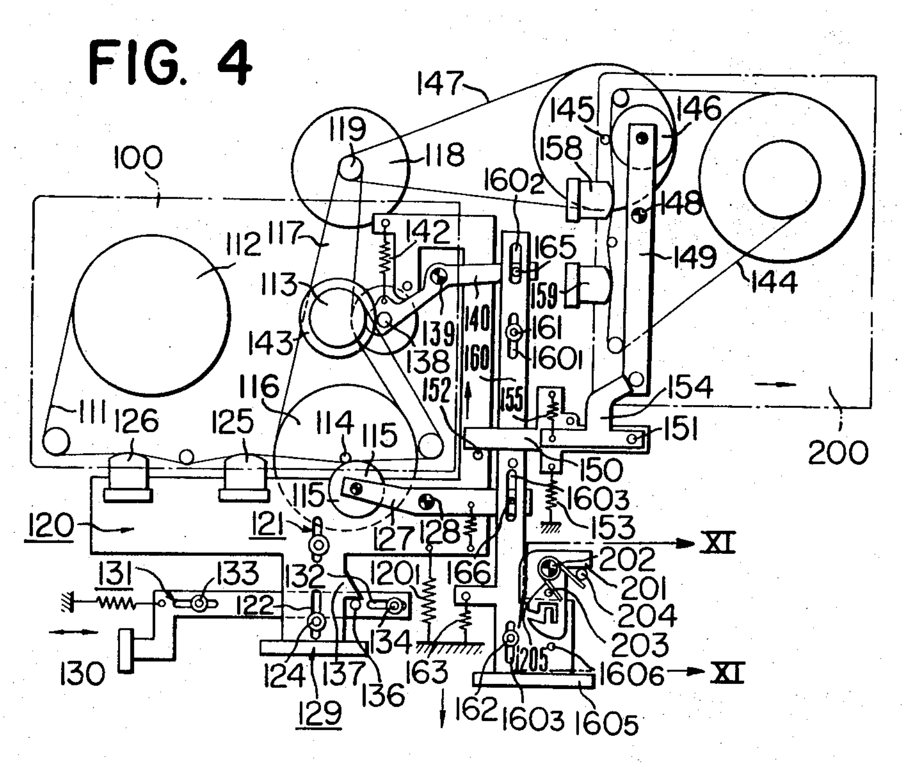
FIG. 4 and 5 are diagrammatic views illustrating a second embodiment of the present invention.
Figure 5:
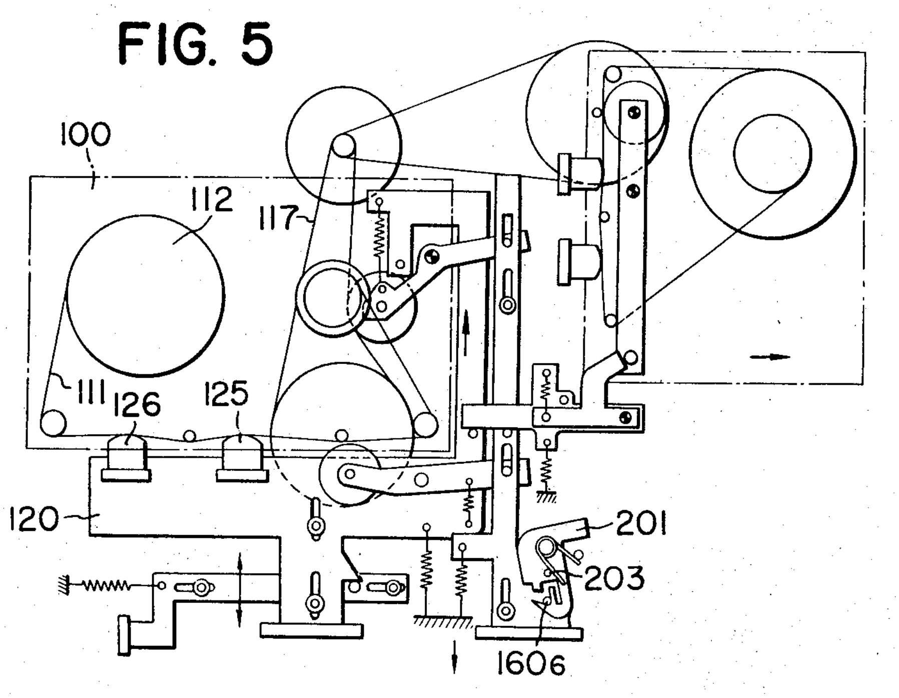
Figure 6:
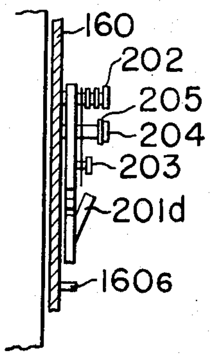
FIG. 6 is a sectional view taken along the line XI—XI of FIG. 4.
Figure 7:
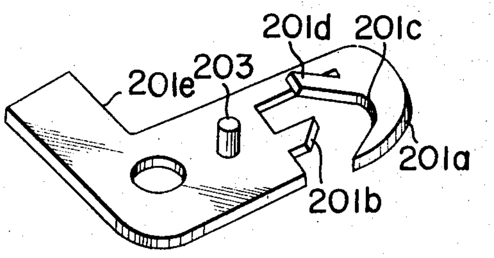
FIG. 7 is a perspective view of a cam used in the second embodiment.
Figure 8:
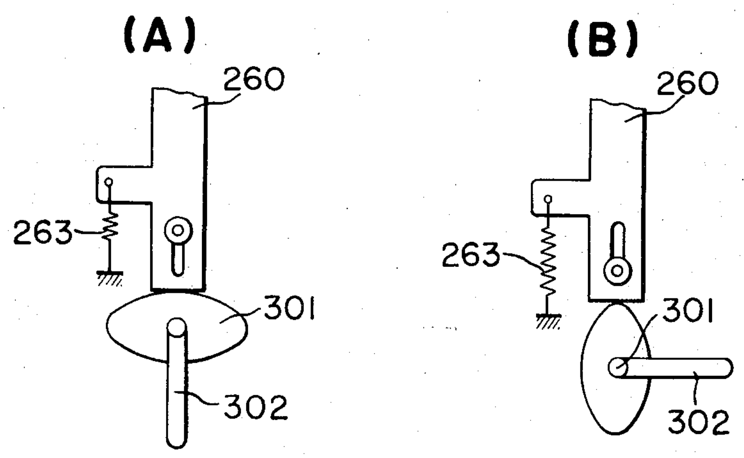
FIG. 8 is a perspective view of a variation of the cam shown in FIG. 7.

The second embodiment employs a double-action operation member instead of the electromagnet used in the first embodiment. The components common in both of the first and second embodiment will not be described while the components different from those of the first embodiment will be described hereinafter. Referring to FIGS. 4 and 5, an engaging cam 201 is rotatably fixed to the chassis by means of a pivot 202, and has an arcuate surface 201*a*, projection 201*b*, notch 201*c*, protrusion 201*d* and a stopper 201*e*. The cam 201 is normally rotated in the clockwise direction under the force of a return spring 205 loaded between a stopper pin 204 extending from the chassis and a pin extending from the cam 201 (See FIG. 6). A switch member 160 corresponds to that 60 shown in FIGS. 2 and 3 and actuated by the electro-magnet and is guided by guide pins 161 and 162 fitted into the slots $160_1$ and $160_3$ formed through the switch member 160. When the switch member 160 is moved upwardly, the pins 165 and 166 extending from the arm 140 carrying the drive roller 138 and the arm 127 carrying the capstant 115 fitted into the slots $160_2$ and $160_3$ of the switch member 160 (corresponding to the slots $60_2$ and $60_3$ of the switch member 60 of the first embodiment) are also moved upwardly, so that the arms 140 and 127 are rotated in the counterclockwise direction, whereby the drive roller 138 is moved away from the reel table 143 while the pinch roller 115 is moved away from the capstan 114. In consequence, the magnetic tape 111 is stopped.

An operation member $160_5$ is formed integral with the switch member 160 at the lower end thereof so that when the operation member $160_5$ is pushed, the switch member 160 is moved upwardly. A pin $160_6$ extends in opposed relation with the arcuate surface of the cam 201. The cam 201 is preferably made of a resilient material. In the second embodiment, the magnetic tapes 111 and 144 are contained in the cartridges 100 and 200 respectively and when the cartridges are loaded, the spools in the cartridges engage with the drive shafts upon the reel tables (not shown) respectively.

When the operation member 129 is pushed upwardly, the heads 125 and 126 upon the carrier member 120 are advanced into the openings formed through the front walls of the cartridge 100 together with the pinch roller 115 so as to be pressed against the tape 111 and the capstan 114 through the tape 111 respectively. Simultaneously, the pin 152 of the carrier member 20 pushes one end of the intermediate lever 150 against the spring 153 so as to rotate it in the clockwise direction about the pivot 151, thereby charging the spring 155 loaded between the actuating lever 154 and the intermediate lever 150. Therefore, under the force of the charged spring 155, the actuating lever 154 is also caused to rotate about the pivot 151 in the clockwise direction so as to press one end of the pinch roller arm 149. In consequence, the arm 149 is caused to rotate about the pivot 148 so as to press the pinch roller 146 against the capstan 145 through the tape 144. In synchronism of the upward movement of the carrier member 120, the motor is energized to rotate the drive roller 138 and the capstans 114 and 145 through the drive belts 117 and 147 so that both of the tapes 111 and 144 are transported at a fixed speed. Since the stop pin 136 of the stop member 130 engages with the projection 137, the carrier is held in operative position (See FIG. 4). The second tape 144 is transported together with the first tape 111 and the pattern speeches recorded on the tape 111 may be reprinted upon the second tape 144.

When it is desired to hear repetitively the reproduced pattern speeches, the operation member $160_5$ is pushed so as to move upwardly the switch member 160. In consequence, the pins 165 and 166 fitted into the slots $160_2$ and $160_3$ of the arms 140 and 127 are also moved upwardly so that the drive roller 138 is moved away from the reel table 143 while the pinch roller 115 is moved away from the capstan 114, whereby the tape 111 is stopped. Upon displacement of the switch member 160, the switch $S_2$ (See FIG. 1) is switched to the terminal *b* from the terminal *a*. Since the carrier member 120 is locked in position by the stopper 136, the endless tape 144 continues to be transported so that the pattern speeches reprinted upon the tape 144 may be reproduced. The student may manually switch the switch $S_3$ from the terminal *a* to the terminal *b* so that he may imitate and record the speeches through the microphone MIC upon the endless tape 144 (the lower track in FIG. 1). When the student switches the switch $S_3$ to the terminal *a* while the endless tape 144 is transported, both of the pattern speeches and the speeches imitated and recorded upon the endless tape 144 may be reproduced repetitively. When the switching member 160 is pushed, the pin $160_6$ slides along the arcuate surface **201*a* of the cam 201 so as to rotate the cam 201 in the counterclockwise direction against the spring 205 and finally engages with the notch 201*c* (See FIG. 5). Therefore, the switch member 160 is held in position shown in FIG. 5 while the spring 163** is charged.

To hear the pattern speeches, the student pushes the operation member $160_5$ again to transport the tape 111 so that the pin $160_6$ in the notch **201*c* of the cam 201 rides over the projection 201*b* and then is positioned at the root of the protrusion 201*d*. On the other hand, the switch member 160 is moved downwardly under the force of the return spring 160, so that the pin $160_6$ slides over the protrusion 201*d* and is disengaged from the cam 201, whereby the switch member 160 is returned to its initial position shown in FIG. 4. Therefore, the drive roller 138 is pressed against the reel table 143 while the pinch roller 115 is pressed against the capstan 114 through the tape 111 so that both of the tapes 111 and 143 are transported. In response to the return movement of the switch member 160**, the switch $S_2$ (See FIG. 1) is switched to the terminal *a* so that the pattern speeches are reproduced through the loudspeaker and reprinted upon the endless tape 144.

To stop all of the operations, the stop member 130 is pushed so as to disengage the pin 136 from the projection 137, whereby the carrier member is returned to its initial position under the force of the return spring $120_1$ and the drive roller arm 140 as well as the pinch roller arm 127 are simultaneously removed from the reel table 143 and the capstan 114 so that the tape 111 is stopped. The pin 152 on the carrier member is moved downwardly so that the intermediate lever 150 is caused to rotate in the counterclockwise direction under the force of the return spring 153, thereby releasing the spring 155 loaded between the intermediate and actuating levers. Consequently, the pinch roller 146 is moved away from the capstan 145 so that the tape 144 is stopped. The carrier member also turns off the drive-switch of the motor 118 so that the latter is stopped.

From the foregoing is is seen that only by the switch member, both of the tapes 111 and 144 may be transported, the tape 111 is stopped while the tape 144 is transported and then both of the tapes 111 and 143 may be transported again at the same time. These switching operation may be made with ease because the single operation member is used. Therefore, the student may switch the mode of hearing the pattern speeches (the first tape being reproduced through a loudspeaker while being reprinted) to the mode of recording and reproduction of the second endless tape, and vice versa.

However, the mode switching may be made in a simple manner without causing the noise even when the switchings may be repeated very frequently. The tape recorder embodying the present invention is especially adapted to learning a foreign language. Furthermore, during the mode switching, the motor is not stopped so that the tapes may be smoothly started.

THIRD EMBODIMENT, FIG. 8

The third embodiment is a variation employing a rotary cam 301 instead of the cam 201 in the second embodiment. The cam 301 is made in contact with one end of a switch member 260 (corresponding to the member 160 in the second embodiment and is rotated by an operation lever 302 fixed to the shaft of the cam 301 to a position shown in FIG. 8, thereby accomplishing the mode switching in a similar manner as described above. From the foregoing, it is seen that the present invention provides a mode switching system for tape recorders which is simple in construction and operation and ensures the better rise-up time characteristics of the tapes when they are switched selectively from one mode to another. The present invention may be applied advantageously to tape recorders for learning a foreign language or to a dictaphone or the like in which the mode switching is made very frequently.

What is claimed is:

1. A magnetic recording-reproducing apparatus having a first magnetic recording medium with a relatively long recording time and a second magnetic recording medium with a relatively shorter recording time, characterized by comprising a first transport means for transporting said first magnetic recording medium at a predetermined speed, said transport means including a capstan and a pinch roller to be brought into pressure contact with said capstan;

said capstan being coupled to a drive means to rotate at a constant speed, a second transport means for transporting said second magnetic recording medium at a predetermined speed, a first selection means for simultaneously driving said first and second transport means, said first selection means having an operation member and a switch member coupled to said operation member and said first and second transport means for switching them between the drive and stop modes, said first and second magnetic recording media being transported when said first selection means is actuated, a second selection means for moving either of said pinch roller and capstan of said first transport means away from the other, the pressure contact between said pinch roller and capstan being released when said second selection means is actuated so that the transport of said first magnetic recording medium is stopped.

2. The magnetic recording-reproducing apparatus according to claim 1 wherein said second selection means is coupled to an electromagnetic drive means which upon energization actuates said second selection means thereby stopping the transport of said first magnetic recording medium.

3. The magnetic recording-reproducing apparatus according to claim 2 wherein said electromagnetic drive means comprises a plunger which is driven in response to the actuation of an external operable switch.

4. The magnetic recording-reproducing apparatus according to claim 1 wherein said second selection means comprises a second operation member, a switch member coupled to at least one of said pinch roller and capstan and adapted to be actuated by said second operation member so as to move either of said pinch roller or capstan from the other, and a locking member for holding said selection member in operative position.

5. The magnetic recording-reproducing apparatus according to claim 2 wherein said second transport means for transporting said second magnetic recording medium has a second capstan and a second pinch roller, said capstan being coupled to a drive means and being driven at a predetermined speed, and said first selection means is coupled to at least one of a second capstan and a second pinch roller so as to press them together upon actuation of said first selection means, thereby transporting said first and second magnetic recording media at a predetermined speed.

6. The magnetic recording-reproducing apparatus according to claim 4 wherein said locking member comprises a cam and a stopper extending from said switch member, said cam being pivotably fixed to a base and having a notch, projections and an inclined cam surface in opposed relation with said stopper and being normally biased to said inclined direction, thereby upon actuation of said second selection means, said switch member is displaced so as to cause said stopper to slide along said inclined cam surface to thereby rotate the cam and then to engage with said notch portion, while upon actuation of said second selection means further, said stopper is released from said notch portion so as to disengage said stopper from said cam, for returning said switch member to its initial position.

7. The magnetic recording-reproducing apparatus according to claim 4 wherein said first transport means further comprises a drive member for driving a takeup reel of said first magnetic recording medium, said drive member being coupled to said first selection means so as to be switched to operative position and coupled to a drive means so as to be rotated at a predetermined speed.

8. The magnetic recording-reproducing apparatus according to claim 4 wherein said second selection means is provided with a displacement cam which is displaced upon actuation of said second selection means, said second selection means being in contact with said cam to follow the displacement of said cam to the operative position.

9. The magnetic recording-reproducing apparatus according to claim 7 wherein said first and second transport means are driven by a single drive means.

10. A magnetic recording-reproducing apparatus having a first magnetic tape, which has a relatively long period of time for recording and reproducing teaching information and a second endless magnetic tape capable of recording and reproducing student information, characterized by comprising first transport means for transporting said first magnetic tape at a predetermined speed, said first transport means having a capstan, a pinch roller and a tape-takeup-member-drive member being driven at a predetermined speed by a drive means, second transport means for transporting said second endless magnetic tape at a predetermined speed, operation means for simultaneously actuating said first and second transport means, and selection means cooperatively associated with said first and second transport means for displacing said pinch roller and said tape-takeup-member-drive member to a non-operating position from an operating position so as to stop the transport of said first magnetic tape while allowing the continued transport of said endless magnetic tape.

11. The magnetic recording-reproducing apparatus according to claim 10 wherein said operation means comprises a movable carrier member which has an operation member and is displaced when the operation member is pushed, a pinch roller carrying member rotatably and resiliently fixed to said carrier member, a spring member for coupling resiliently said carrier member and said drive member for holding said drive member in operative position, and a locking member for holding said carrier member in predetermined position, and said switch means is adapted to forcibly move said drive member and said pinch roller carrying member by an electromagnet member away from a takeup reel and said capstan thereby stopping the transport of said first magnetic tape.

12. The magnetic recording-reproducing apparatus according to claim 10 wherein said first and second transport means is driven by a single motor.

* * * * *